Aug. 2, 1932.  R. S. LATIMER  1,869,939
HEATING APPARATUS
Filed April 18, 1928   3 Sheets-Sheet 1

Inventor
Roy S. Latimer,
By Cushman Bryant & Darby
Attorneys

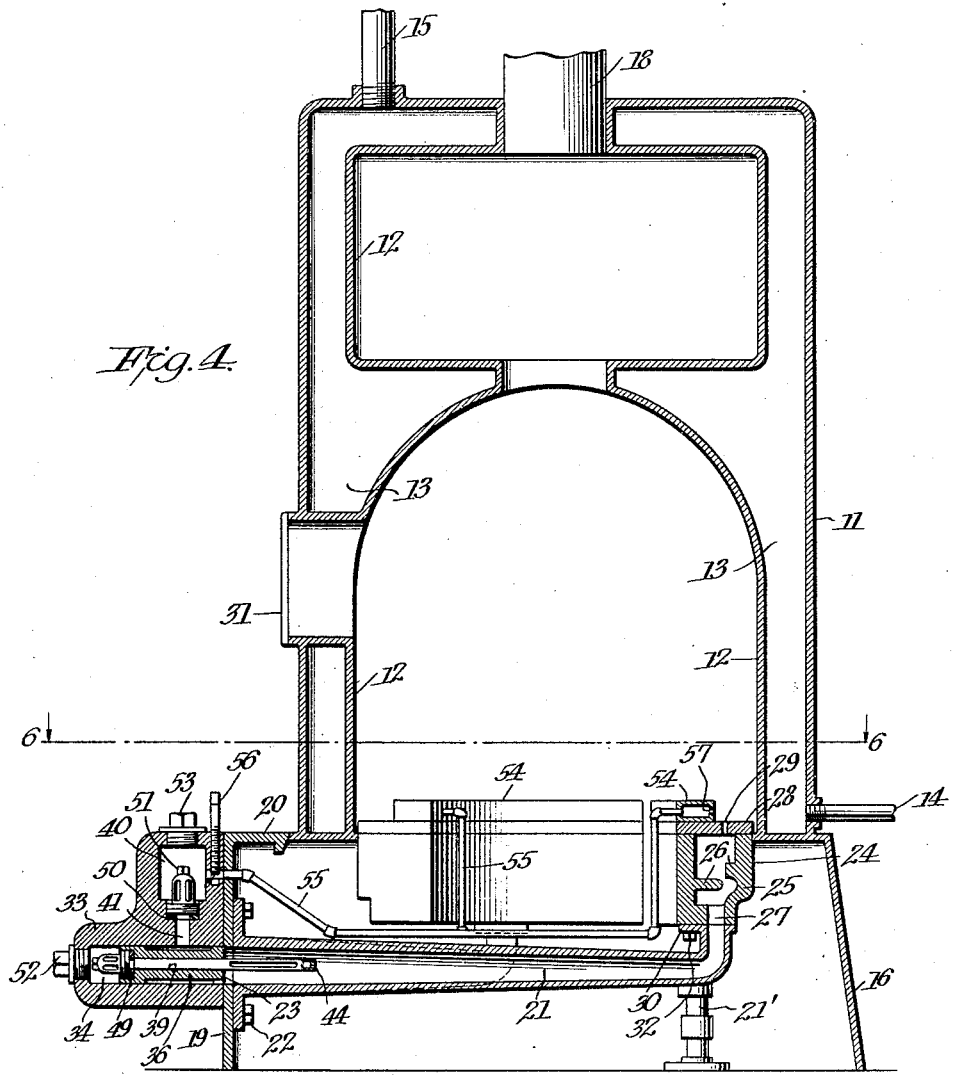
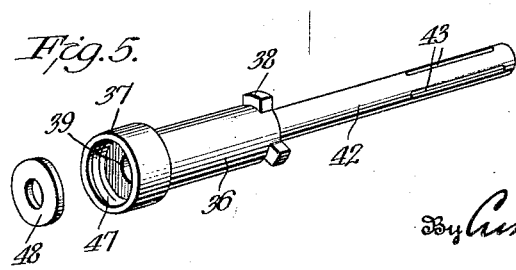

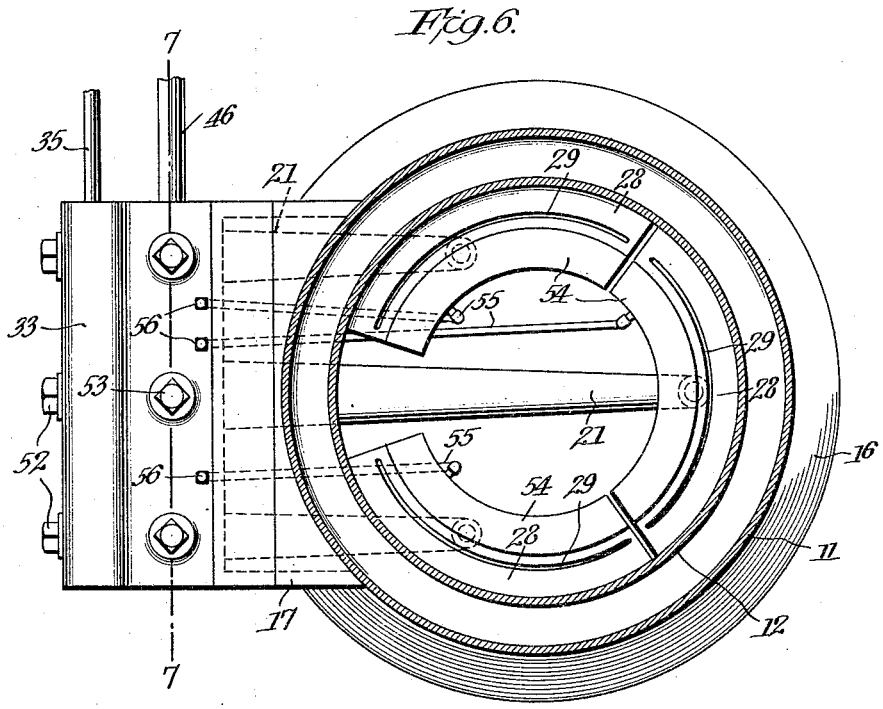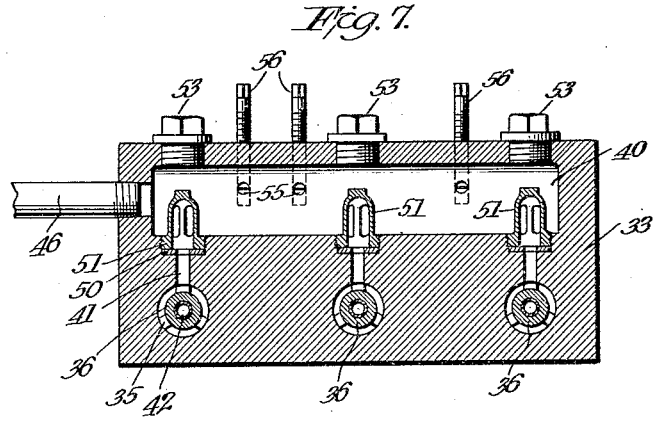

Patented Aug. 2, 1932

1,869,939

UNITED STATES PATENT OFFICE

ROY S. LATIMER, OF TROY, NEW YORK

HEATING APPARATUS

Application filed April 18, 1928. Serial No. 271,063.

The present invention has to do with improvements in gas fired heaters generally, and specifically with means for converting a conventional grate furnace into a gaseous fuel burning furnace. In other words, several of the novel features to be hereinafter described are applicable to gaseous fuel burners of all types, while other features relate only to the means by which a conventional steam, hot water, or hot air furnace may be converted from a solid fuel burner into a gaseous fuel burner. The particular gaseous fuel contemplated in the present invention, is ordinary gas from the city mains.

Without going further into the general aspects of the invention, I shall proceed to describe it specifically with reference to the accompanying drawings, wherein:

Figure 4 is a vertical section on the line 4—4 of Figure 1.

Figure 5 is a perspective of a preferred form of mixing nozzle.

Figure 6 is a horizontal section on the line 6—6 of Figure 4, and

Figure 7 is a vertical section on the line 7—7 of Figure 6.

Figure 1:
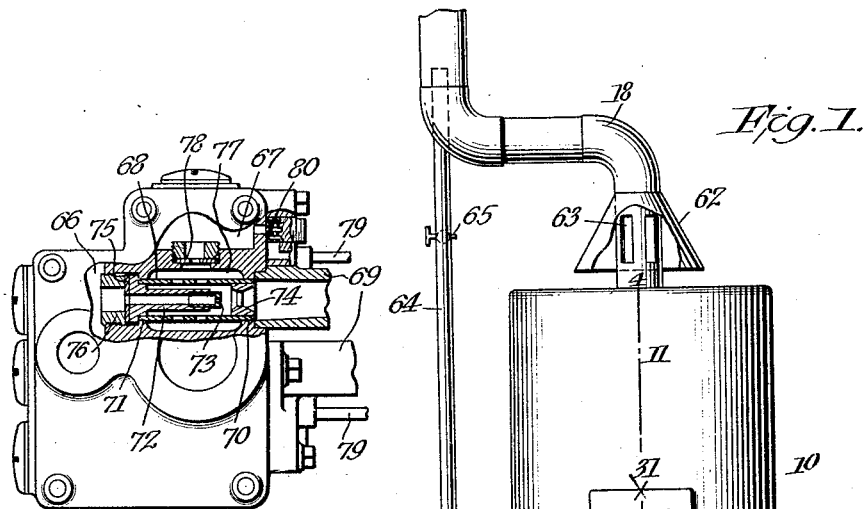
Figure 1 is a front elevation of a usual type of furnace, for example a hot water furnace, equipped with the several adjuncts contemplated in the present invention.

Referring now to the drawings, 10 indicates, as a whole, a conventional form of furnace which, by way of example, may be assumed to be a hot water furnace of cylindrical form having outer walls 11 and inner walls 12 forming a water-tight compartment 13 with an inlet at 14 and an outlet at 15. The boiler portion thus constituted is supported on an ash pit frame 16, which latter is provided with a door frame 17 as most clearly indicated in Figure 6. The space interior of walls 12 constitutes the fire pot which communicates with a suitable chimney by means of a flue 18.

Assuming that the furnace has originally included a grate for solid fuel, this grate will preferably be entirely removed and the front of the furnace will then be closed by a header assembly unit which will now be described. This header assembly unit has a frame comprising an upright slab 19, a top panel 20, and suitably formed side panels. The frame, which supports various elements hereinafter described, is moved into register with the open frame 17 and secured in this position either by bolts and nuts, or by a cable running around base 16, or in any other suitable manner. The slab 19, when thus positioned, is adapted to support several feed pipes 21 with their free ends terminating at desired points within the ash pit. As here shown, three feed pipes are provided and these are secured to slab 19 by bolts 22, the slab being provided with perforations 23 in alignment with the passages for the pipes. As shown, the feed pipes preferably taper from their outer to their inner ends. In order to relieve the pipe supporting frame of unnecessary strain, I may provide an adjustable jack 21' under the inner end of each of pipes 21.

The burner unit which I provide, consists of a suitable number of arcuate elements 24, three being provided in the present instance, one for each feed pipe. One form of burner is shown in cross-section in Figure 4, and consists of the arcuate trough 25, provided with inner baffles 26 above inlet opening 27, and a burner plate 28. The burner plate 28 is provided with an arcuate slot 29 above which the flame stands. As most clearly shown in Figure 4, the feed pipes 21 have their inner ends turned upwardly and expanded into flanges 30. Referring to Figure 6, it will be seen that the inner ends of feed pipes 21 are substantially equidistant from the center of the ash pit and from each other, and also that they terminate adjacent the interior heat absorbing walls 12 of the boiler. In assembling the burner elements, they are inserted through the fire door 31 of the furnace and placed upon the flanges 30 with their apertures 27 in register with the openings of the feed pipes, and they may be secured in this position by means of cap screws 32. The three arcuate burner elements taken together form a burner unit substantially coextensive with the inner peripheries of walls 12, although, preferably, there will be a break in the continuity of the burners immediately below fire door 31, as indicated in Figure 6.

Attached to the outer face of slab 19, is a gas and air header 33. This header is provided in the present instance, with three bores 34 registering with the three apertures 23 in slab 19. The outer ends of bores 34 are connected by a horizontal passage which, in turn, is connected to the source of gas supply through the customary reducing valve (not shown) by means of a pipe 35. In each of the bores 34 is disposed a mixing nozzle of the form shown in Figures 4 and 5. Referring to these figures, the nozzle will be seen to consist of a spool-like member 36, whose flanged ends 37 and 38 are of such a size as to contact closely with the walls of a bore 34. Flange 37 is imperforate and forms an airtight fit in the bore, while flange 38 is interrupted, or perforated, as shown. Header 33 is provided with a further horizontal passage 40 at its upper part, and this passage is connected with bores 34 by means of vertical passages 41, these latter debouching into bores 34 intermediate the flanges or filling means 37 and 38 of element 36, that is, into the annular chamber formed between the flanges. A tubular element 42 is secured in bore 39 of element 36, with its outer end projecting considerably beyond the end of element 36 and provided with lateral perforations 43, the end of the tubular element being plugged or closed as at 44.

A fan 45 running at a uniform rate of speed supplies air through a pipe 46 to passage 40 of the header, thence to the annular chambers surrounding elements 36, whence it is discharged through the openings in flanges 38 into feed pipes 21. At the same time, gas is supplied through pipe 35 to passage 34, and through the apertures 43 of tubular elements 42 across the streams of air. The air and gas thus mixed are rolled along pipes 21 to the burners and the combustible mixture is ignited above the plates 28, and forms sheets of flame which scrub along walls 12.

While the gas supplied in various cities is variable to a certain extent in its properties, the characteristics of the gas supplied in any one city are substantially constant, and are known and recorded. Thus, while the quality of gas and air may vary as to different cities, yet, the factors are constant as to all parts of the same city. Consequently, I propose to provide simple means by which the air and gas inlets may be set by the manufacturer in accordance with the requirements of any given locality. This is for the purpose of obviating the usual adjustments which are provided, and which, being usually set by unskillful persons, often lead to inefficient operation.

Referring then to Figures 4 and 5, it will be seen that flange, or filling means 37 of each nozzle is provided at its free end with a threaded recess 47. This recess is adapted to receive a perforated disc, or washer 48, the size of whose perforation is based upon the known characteristics of the gas which is to be supplied. Washer 48 is seated in recess 47 by means of a hollow threaded plug element 49. Similarly, the upper end of passages 41 are enlarged and threaded to receive washers 50 and plugs 51. In order that plugs 49 and 51 may be removed and the washers changed in case of necessity, header 33 is provided with threaded apertures in alignment with bores 34 and passages 41, respectively, these apertures being fitted with screw plugs 52 and 53.

Figure 2:
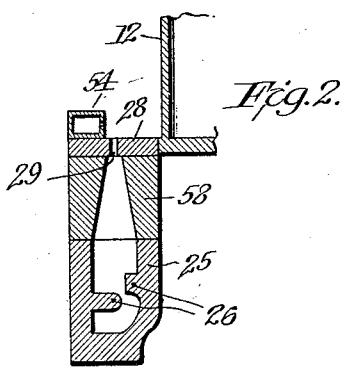
Figure 2 is a cross-section of one form of burner and the adjacent section of the furnace wall.

The air and gas mixture rises through burner slots 29 with considerable velocity, and thus the flame has a tendency to rise and to suffer undue agitation. As one means of overcoming these tendencies, I dispose air boxes, or conduits, 54 along the inner edges of burner plates 28. These boxes, one for each burner element, are supplied with air by means of pipes 55 which connect the boxes with passage 40 of the header through suitable apertures in slab 19. Only a very small quantity of air need be introduced to the boxes, and to regulate this quantity, screw valves 56 are provided. As particularly shown in Figure 4, boxes 54 are provided with perforations 57 on their sides next to the flame. I have found that by supplying a small quantity of air thus at the base of the flame, the flame is held down to the burner plates. A certain quantity of the air supplied in this manner acts to increase the rate of combustion at the burner openings, and this, I term "safety air". In Figure 2, it will be noted that a channel is formed between box 54 and wall 12, while according to Figure 3, a similar channel is formed between box-forming wall 12 and the upper margin of a wall 59′, the channel in each instance being considerably wider than slot 29. With this arrangement, the combustible mixture may be discharged through slot 29 at five times the rate of flame propagation, this speed being retarded when the mixture enters what may be termed the combustion channel. This retardation has a cooperative function with the safety air in preventing the lifting of the flame. By increasing the amount of air beyond that which will be assimilated by the flame, a rising air curtain interiorly of the flame will be formed which tends to decrease the flame agitation and to hold the flame against wall 12. By these devices, the efficiency of the apparatus is very greatly increased.

Figure 3:
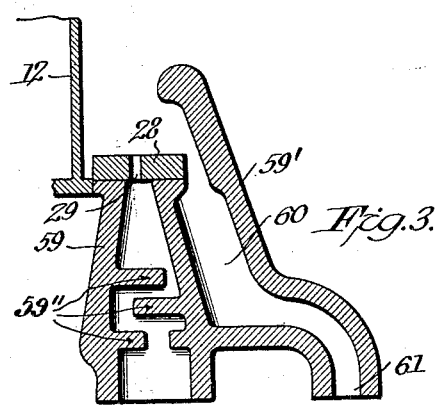
Figure 3 is a cross-section of a modified form of burner and a portion of the adjacent furnace wall.

The flame may also be held to the burner plate by tapering the upper portion of the trough to give it the form of a truncated pyramid, as indicated in Figures 2 and 3, so that the combustible mixture increases gradually in velocity up to the burner openings. According to Figure 2, a tapered section 58 is interposed between trough 25 and plate 28 of Figure 4. According to Figure 3, 59 is a tapered section adapted to be interposed in the same manner, and integral with this section is a wall 59' which forms an air passage or box 60. It is found desirable to form the trough so that as the mixture passes upwardly therein to the burner opening 29, it follows a tortuous course; for this purpose the baffles 26 are provided in the form of Figures 1 and 2 and the baffles 59" in the device of Figure 3. As here shown, wall 59' is extended somewhat above plate 28 to form a baffle. Air is introduced into passage 60 through a canal 61.

As is well known, the burnt gases have a tendency to condense in the flue, causing the rapid deterioration of the latter. In view of this fact, the underwriters some times require gas fired furnaces to be equipped with so-called "draft hoods", such as are shown at 62, Figure 1. Such a hood consists merely of an inverted funnel-shaped element secured to the flue, and within the upper and lower limits of the hood, the flue is perforated as at 63, so that air may enter to lower the relative humidity and thus reduce condensation. Also, such a device prevents a back draft from entering the fire pot. As a further means of preventing such condensation, I propose to provide a pipe 64 between the blower and the flue beyond the draft hood. The additional amount of air supplied to the flue through pipe 64 further lowers the relative humidity, and if introduced in sufficient quantity, makes condensation impossible. A valve 65 may be provided for regulating the flow of air through pipe 64.

Figure 8:
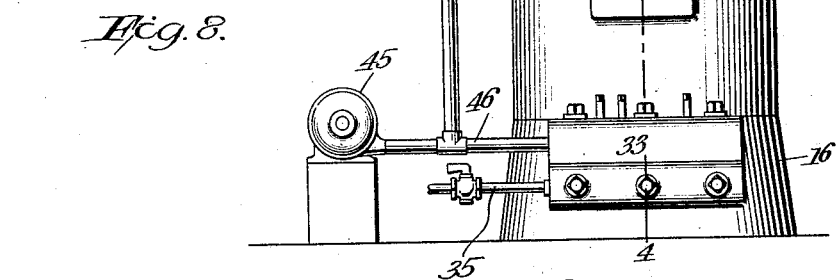
Figure 8 is a side elevation, partly in section, of an alternative form of gas and air header.

In the modified form of header shown in Fig. 8, 66 is the gas inlet chamber, and 67 the air inlet chamber. A perforated tubular element 68, one for each feed pipe 69, is supported at its ends in an aperture 70 in the rear wall of the header, and in an aperture 71 in the partition wall, which separates the air and gas inlet chambers. A nozzle 72 projects within tubular element 68, and supports at its ends an axially perforated cap 73. Somewhat in advance of cap 73 a ring 74, in the nature of a Venturi tube, is fixed in tubular element 68. A perforated regulating washer 75 for the gas supply from chamber 66 is disposed at the outer end of the nozzle and the washer and nozzle are retained in position by a threaded collar 76. An annular chamber 77 surrounds element 68, air from chamber 67 having access thereto through a regulating washer 78. The auxiliary air supply to tubes 79 may also be controlled by washers as at 80.

While I have specifically described the various elements of my invention, it is to be understood that they are susceptible of considerable change without departing from the spirit of the invention. Accordingly, it is to be understood that I do not intend to be limited except as determined in the following claims:

I claim:

1. A burner for converting a grate furnace having an ash pit opening into a gas fired furnace, said burner comprising a plurality of burner-element sections adapted to replace the grate, said sections forming a substantially continuous burner element unit conforming substantially to the contour of the inner side walls of a furnace in juxtaposition thereto, a gas and air inlet header having associated therewith means adapted to be positioned at the ash pit opening and substantially to close the same, means for introducing air under pressure into said header, means for introducing gas into said header and mixture feed pipes supported by said header and adapted to extend through the ash pit opening into the ash pit, said feed pipes terminating at spaced points within the ash pit, one of said burner elements being supportable by and in communication with the end of each of said feed pipes, and a plurality of mixing devices mounted in said header adapted to mix air and gas for each of said mixture pipes.

2. A burner unit for use with a heater having a combustion chamber with heat absorbing side walls surrounding the same comprising a plurality of gas and air supply pipes extending into said chamber and terminating at spaced points adjacent said side walls, a burner element supported on the end of each of said pipes and in communication therewith, said elements having burner mixture discharge openings and forming a substantially continuous burner unit conforming substantially to the contour of said walls, and means for supplying air under pressure above and to the side of aid burner mixture dicharge openings remote from said side walls.

3. A burner unit for use with a heater having a combustion chamber with heat absorbing side walls surrounding the same comprising a plurality of gas and air supply pipes extending into said chamber and terminating at spaced points adjacent said side walls, a burner element supported on the end of each of said pipes and in communication therewith, said elements having burner mixture discharge openings and forming a substantially continuous burner unit conforming substantially to the contour of said walls, and means for forming an air curtain in said chamber inwardly of said burner openings and externally of the same.

4. A burner unit for use with a heater having a combustion chamber with heat absorbing side walls surrounding the same comprising a plurality of rigidly supported fuel supply pipes extending into said chamber and terminating at spaced points adjacent said side walls, a burner element supported on the end of each of said pipes and in communication therewith, said elements having burner openings and forming a substantially continuous burner unit conforming substantially to the contour of said walls, and air boxes disposed above and to the side of said burner openings remote from said side walls, said boxes being adapted to supply air adjacent the burner openings.

5. A burner unit for use with a heater having a combustion chamber with heat absorbing side walls surrounding the same comprising a burner element in juxtaposition to said side wall at the base thereof, said burner element being provided with an upper burner mixture outlet opening, and means to supply air under pressure from the exterior of a combustion chamber slightly above and to the side of said opening remote from said side wall.

6. A burner unit for use with a heater having a combustion chamber with heat absorbing side walls surrounding the same comprising a horizontal burner plate extending in juxtaposition to said side wall at the base thereof, and an air box in spaced relation to said side wall, said plate being perforated intermediate said box and wall, said box being adapted to discharge air toward said wall.

7. In a gaseous fuel burner, the combination with a header having a bore, an inlet in communication with said bore intermediate its ends, and a second inlet in communication with the outer end of said bore, of a mixing nozzle mounted in said bore, said nozzle comprising a central tubular member in communication with said second inlet, inner and outer filling means between said tubular member and said bore at either side of said first inlet whereby an annular chamber in communication with that inlet is formed, the inner filling means being perforate and the outer filling means being imperforate, said tubular member projecting beyond said perforate filling means and the projecting end thereof being laterally perforate, a mixture feed pipe having one end in communication with said bore, and a burner element at the other end of said feed pipe.

8. In a gaseous fuel burner, the combination with a header having a bore, an inlet in communication with said bore intermediate its ends, and a second inlet in communication with said bore at its outer end, of a mixing nozzle positioned in said bore, said nozzle comprising a tubular element in said bore and having its intermediate portion spaced from the walls of the bore to form a chamber in communication with said first inlet, and a second tubular element within the first and in communication at its outer end with said second inlet, a mixture feed pipe having one end in communication with said header to receive mixture therefrom, and a burner element being provided with a mixture discharge orifice at the other end of said pipe.

9. In a gaseous fuel burner, the combination with a header having a bore, an inlet in communication with said bore intermediate the ends of the latter, and a second inlet in communication with the outer end of said bore, of a mixing nozzle positioned in said bore, said nozzle comprising a spool-like element with inner and outer flanges at either side of said first inlet, the inner flange of said element being perforate and the outer flange being imperforate and closely fitting said bore, said element being axially apertured, and a tube projecting from the inner end of said element, the projecting end of said tube having lateral perforations, as and for the purpose described, a mixture feed pipe having one end in communication with said bore and a burner element at the other end of said pipe.

10. In a gaseous fuel burner, the combination with a header having a bore, an inlet in communication with said bore intermediate the ends of the latter, and a second inlet in communication with the outer end of said bore, of a mixing nozzle positioned in said bore, said nozzle comprising a spool-like element with inner and outer flanges at either side of said first inlet, the inner flange of said element being perforate and the outer flange being imperforate and closely fitting said bore, said element being axially apertured, a tube projecting from the inner end of said element, the projecting end of said tube being laterally perforate, and a tapered feed pipe having its large end in communication with the inner end of said bore.

11. In a gaseous fuel burner, the combination with a header having a bore, an inlet in communication with said bore intermediate the end of the latter, and a second inlet in communication with the outer end of said bore, of a mixing nozzle positioned in said bore, said nozzle comprising a spool-like element with inner and outer flanges at either side of said first inlet, the inner flange of said element being perforate and the outer flange being imperforate and closely fitting said bore, said element being axially apertured, a tube projecting from the inner end of said element, the projecting end of said tube having lateral perforations, a control washer seated on the outer end of said element, and means for removably securing said washer in seated position.

12. In a gas heating unit, an arcuate burner head having a gas and air mixture orifice, and means for supplying externally of and adjacent the orifice at the concave side thereof air under pressure in excess of the quantity normally assimilable by the flame, whereby to provide a rising air curtain adjacent the flame and to direct the flame toward the convex side of the burner head.

13. A burner for converting a solid fuel burning furnace having an ash pit opening into a gas fired furnace, comprising a gas and air inlet header adapted to be positioned at the ash pit opening and having associated therewith means adapted substantially to seal said opening, said sealing means comprising a plate positioned over said ash pit opening and having the header on the side thereof externally of said furnace, means for admitting air and gas into said header, means positioned in said header for mixing the air and gas, a feed pipe for the combustible mixture connected to said header through said plate and adapted to extend from the ash pit opening into the ash pit, and a burner element supportable by and in communication with said feed pipe.

14. A burner for converting a solid fuel burning furnace having an ash pit opening into a gas fired furnace, comprising a gas and air inlet header adapted to be positioned at the ash pit opening and having associated therewith means adapted substantially to seal said opening, said sealing means comprising a plate positioned over said ash pit opening and having the header on the side thereof externally of said furnace, means for separately introducing air under pressure and gas into said header, means positioned in said header for mixing the air and gas, a feed pipe for the combustible mixture connected to said header through said plate and adapted to extend from the ash pit opening into the ash pit, and a burner element supportable by and in communication with said feed pipe.

15. A burner for converting a solid fuel burning furnace having an ash pit opening into a gas fired furnace, comprising a gas and air inlet header adapted to be positioned at the ash pit opening and having associated therewith means adapted substantially to seal said opening, means for admitting air and gas into said header, means positioned in said header for mixing the air and gas, a feed pipe for the combustible mixture connected to said header and adapted to extend from the ash pit opening into the ash pit, a burner element supportable by and in communication with said feed pipe, and adjustable means adapted to rest upon the floor of an ash pit and to support said feed pipe adjacent the burner element.

16. A burner for converting a solid fuel burning furnace having an ash pit opening into a gas fired furnace, comprising a gas and air inlet header adapted to be positioned at the ash pit opening and having associated therewith means adapted substantially to seal said opening, means for admitting air and gas into said header, means positioned in said header for mixing the air and gas, a feed pipe for the combustible mixture connected to said header and adapted to extend from the ash pit opening into the ash pit, a burner element supportable by and in communication with said feed pipe, said header having air and gas passages, and perforate passage-control discs removably arranged within the header in said passages.

17. A burner for converting a solid fuel burning furnace having an ash pit opening into a gas fired furnace, comprising a gas and air inlet header adapted to be positioned at the ash pit opening and having associated therewith means adapted substantially to seal said opening, feed connections admitting air and gas into said header, means positioned in said header for mixing the air and gas, a pipe for the combustible mixture connected to said header and adapted to extend from the ash pit opening into the ash pit, a burner element supportable by and in communication with said feed pipe, said header having air and gas passages, and perforate passage control discs removably arranged within the header in said passages, said discs being removable without disturbing the air or gas feed connections or the mixture pipe connection with said header.

18. A burner for converting a solid fuel burning furnace having an ash pit opening into a gas fired furnace, comprising a gas and air inlet header adapted to be positioned at the ash pit opening and having associated therewith means adapted substantially to seal said opening, a plurality of feed pipes for combustible mixture connected to said header and adapted to extend from the ash pit opening into the ash pit, a burner element section supported by and in communication with each of said feed pipes, said burner element sections forming a substantially continuous burner element adapted to be arranged adjacent the interior wall of a furnace, each section having a mixing chamber leading upwardly by a tapering passage to a burner orifice.

19. A burner for converting a solid fuel burning furnace having an ash pit opening into a gas fired furnace, comprising a gas and air inlet header adapted to be positioned at the ash pit opening and having associated therewith means adapted substantially to seal said opening, a plurality of feed pipes for combustible mixture connected to said header and adapted to extend from the ash pit opening into the ash pit, a burner element section supported by and in communication with each of said feed pipes, said burner element sections forming a substantially continuous burner adapted to be arranged adjacent the interior wall of a furnace, each section having a mixing chamber leading upwardly by a tortuous tapering passage to a burner orifice.

20. A burner for converting a solid fuel burning furnace having an ash pit opening into a gas fired furnace, comprising a gas and air inlet header adapted to be positioned at the ash pit opening and having associated therewith means adapted substantially to seal said opening, a plurality of feed pipes for combustible mixture connected to said header and adapted to extend from the ash pit opening into the ash pit, a burner element section supported by and in communication with each of said feed pipes, said sections forming a substantially continuous burner element adapted to be arranged adjacent the interior wall of a furnace, each section having a mixing chamber leading upwardly by a tapering passage to a burner orifice, and means projecting above said orifices radially inwardly from the burner element adapted to form with the wall of a furnace an upwardly opening combustion channel above the orifices.

21. A burner for converting a solid fuel burning furnace having an ash pit opening into a gas fired furnace, comprising a gas and air inlet header adapted to be positioned at the ash pit opening and having associated therewith means adapted substantially to seal said opening, a plurality of feed pipes for combustible mixture connected to said header and adapted to extend from the ash pit opening into the ash pit, a burner element section supported by and in communication with each of said feed pipes, said burner sections forming a substantially continuous burner element adapted to be arranged adjacent the interior wall of a furnace, each burner section having a mixing chamber leading upwardly to a burner orifice, means projecting above said orifices radially inwardly from the burner element adapted to form with the wall of the furnace an upwardly opening combustion channel above the orifices, and means for supplying externally of said burner orifices air under pressure to said combustion channel.

22. A burner for converting a solid fuel burning furnace having an ash pit opening into a gas fired furnace, comprising a gas and air inlet header adapted to be positioned at the ash pit opening and having associated therewith means adapted substantially to seal said opening, a plurality of feed pipes for combustible mixture connected to said header and adapted to extend from the ash pit opening into the ash pit, a burner element section supported by and in communication with each of said feed pipes, said sections forming a substantially continuous burner element adapted to be arranged adjacent the interior wall of a furnace, each burner element having a mixing chamber leading upwardly to a burner orifice, means projecting above said orifices radially inwardly from the burner element adapted to form with the wall of a furnace an upwardly opening combustion channel above the orifices, and means for supplying externally of said burner orifices air under pressure to said combustion channel, said last mentioned means being adapted to direct the air across said burner orifices in the general direction of the furnace wall which forms the other side of the combustion channel.

23. For use in a gas fired furnace a substantially continuous burner element formed of a plurality of sections adapted to be arranged in juxtaposition to a furnace wall, a plurality of mixture feed pipes, one leading to each section, each section comprising a mixture trough leading upwardly to burner mixture-outlet orifices, and means disposed radially inwardly from said orifices above the latter adapted to supply air under pressure whereby to form a rising air curtain on the radially inward side of the burner element.

24. For use in a gas fired furnace a substantially continuous burner element formed of a plurality of sections adapted to be arranged in juxtaposition to a furnace wall, a plurality of mixture feed pipes, one leading to each section, each section comprising a mixture trough tapering upwardly to burner mixture-outlet orifices, and means disposed radially inwardly from said orifices above the latter adapted to supply air under pressure whereby to form a rising air curtain on the radially inward side of the burner element.

25. For use in a gas fired furnace a substantially continuous burner element formed of a plurality of sections adapted to be arranged in juxtaposition to a furnace wall, a plurality of mixture feed pipes, one leading to each section, each section comprising a mixture trough tapering upwardly to mixture-outlet orifices and having a tortuous path leading to said orifices, and means disposed radially inwardly from said orifices above the latter adapted to supply air under pressure whereby to form a rising air curtain on the radially inward side of the burner element.

26. For use in a gas fired furnace, a substantially continuous burner element adapted to be arranged in juxtaposition to the interior wall of a furnace, and formed in a plurality of sections arranged end to end, said sections each having a mixture trough leading upwardly to a mixture-outlet orifice, and means for supplying air under pressure above said burner orifices on the radially inner side of said burner element.

27. For use in a gas fired furnace, a substantially continuous burner element adapted to be arranged in juxtaposition to the interior wall of a furnace and formed in a plurality of sections arranged end to end, said sections each having a mixture trough leading upwardly to a burner orifice, means for supplying air under pressure above said burner orifices on the radially inner side of said burner element, a mixture pipe leading to each of said sections, and a gas and air inlet header connected to said pipe, said header having a plurality of mixing chambers and gas and air passages leading to each of said chambers.

28. For use in a gas fired furnace, a substantially continuous burner element adapted to be arranged in juxtaposition to the interior wall of a furnace and formed in a plurality of sections arranged end to end, said sections each having a mixture trough leading upwardly to a burner orifice, means for supplying air under pressure above said burner orifices on the radially inner side of said burner element, a mixture pipe leading to each of said sections, a gas and air inlet header connected to said pipes and having gas and air inlet connections, said header having a plurality of mixing chambers and gas and air passages leading to each of said chambers, and non-adjustable but removable disc control means for the gas and air supply passages in said header, said means being removable independently of the header connections.

29. For use in a gas fired furnace, a burner element comprising a head arcuately shaped in a horizontal plane and adapted to be arranged with its convexed outer side closely adjacent a furnace wall, said head having a gas and air mixture orifice, and means on the concave side of said head for directing adjacent the mixture jet and head an air curtain adapted to prevent rising of the flame.

30. For use in a gas fired furnace, a burner element comprising a head arcuately shaped in a horizontal plane and adapted to be arranged with its convexed outer side closely adjacent a furnace wall, said head having a gas and air mixture orifice, and means on the concave side of said head for directing adjacent the mixture jet and head an air curtain adapted to prevent rising of the flame and to maintain the flame and jet in proximity to a furnace wall disposed at the opposite side of said head.

31. For use in a gas fired furnace, a burner element comprising a head arcuately shaped in a horizontal plane and adapted to be arranged with its convexed outer side closely adjacent a furnace wall, said head having a gas and air mixture orifice adapted to direct a mixture jet upwardly along a furnace wall, and means on the concave side of said head for directing adjacent the mixture jet and head an air curtain adapted to prevent rising of the flame.

32. For use in a gas fired furnace, a burner element comprising a head arcuately shaped in a horizontal plane and adapted to be arranged with its convexed outer side closely adjacent a furnace wall, said head having a gas and air mixture orifice adapted to direct a mixture jet upwardly along a furnace wall, and means on the concave side of said head for directing adjacent the mixture jet and head an air curtain adapted to prevent rising of the flame and to maintain the flame and jet in proximity to a furnace wall disposed at the opposite side of said head.

33. A burner for a gas fired furnace having an interior wall to be heated comprising a head adapted to be disposed in close proximity to said wall, said head being provided with a gas and air mixture orifice adapted to direct a jet upwardly along the wall, and means on the inner side of said head for supplying an air curtain externally of said orifice and in excess of the quantity normally assimilable by the flame formed by the orifice jet, said means being disposed to direct said air curtain so as to prevent rising of the flame.

34. A burner for a gas fired furnace having an interior wall to be heated comprising a head adapted to be disposed in close proximity to said wall, said head being provided with a gas and air mixture orifice adapted to direct a jet upwardly along the wall, and means on the inner side of said head for supplying an air curtain externally of said orifice and in excess of the quantity normally assimilable by the flame formed by the orifice jet, said means being disposed to direct said air curtain so as to prevent rising of the flame and to maintain the flame directed toward the opposite side of the burner head, whereby the flame will be maintained in close proximity to the furnace wall.

35. For use in a gas fired furnace having a surface to be heated, a burner head adapted to be arranged adjacent said surface and having a gas and air mixture orifice forming a combustion area immediately adjacent said orifice, and means at one side of said orifice substantially co-extensive with said head for supplying air in excess of the quantity normally assimilable by the flame under pressure adjacent and at one side of said orifice externally of the latter, said means being disposed to provide an air curtain substantially co-extensive with said head at one side of said orifice and immediately adjacent the flame, whereby to confine the combustion area adjacent said orifice and to limit movement of the flame laterally toward the side of the head at which said means is positioned.

36. For use in a gas fired furnace having a surface to be heated, a burner head adapted to be arranged adjacent said surface and having a gas and air mixture orifice forming a combustion area immediately adjacent said orifice, and means at one side of said orifice substantially co-extensive with said head for supplying air in excess of the quantity normally assimilable by the flame under pressure adjacent and at one side of said orifice externally of the latter, said means being disposed to provide an air curtain substantially co-extensive with said head at one side of said orifice and immediately adjacent the flame, whereby to confine the combustion area adjacent said orifice and to limit movement of the flame laterally toward the side of the head at which said means is positioned, said means and head being of substantially endless form whereby to be arranged adjacent a horizontally continuous wall.

37. In a device of the class described, means for burning a flame in a sheet-like form, means for discharging air under pressure at one side of said sheet-like flame in a direction substantially parallel with said flame, and means diverting said air toward said flame to form a curtain for the flame.

38. The combination with an air or water heater, of means for burning a combustible mixture in a flame in the form of a sheet adjacent the wall thereof, and means for directing a flow of air under pressure in a line substantially parallel with said flame and for diverting said air in a direction toward the side of the flame opposite the heater wall to form an air curtain adjacent the flame.

39. In a device of the class described, a body having a combustible mixture chamber and a pressure air chamber, both of said chambers opening in the same direction, and a baffle arranged adjacent the air opening to direct the air flowing from said opening in the form of a sheet toward the path of the combustible mixture flowing from the opening of the combustible mixture chamber.

40. In a device of the class described, a burner tip of arcuate form having a single arcuate slot therein, means for forcing a combustible mixture through said slot in said burner tip, an arcuate baffle arranged adjacent the tip, and means for supplying air under pressure between the tip and baffle, said baffle having an upper portion extending toward the path of the combustible mixture passing from said slot in said tip whereby the air is directed toward said path.

41. In a device of the class described, a burner tip having a single slot therein, means for forcing a combustible mixture through said slot in said burner tip, a baffle arranged adjacent the tip, and means for supplying air under pressure between the tip and baffle, said baffle having an upper portion extending toward the path of the combustible mixture passing from said slot in said tip whereby the air is directed toward said path.

42. In a device of the class described, the combination with means for burning a gaseous mixture in a vertical flame, of means for creating a vertical air curtain on one side of said flame.

43. The combination with an air or water heater, of means for burning a gaseous mixture in a vertical flame adjacent the wall thereof, and means for creating a vertical air curtain on the side of the flame remote from the wall of the heater.

44. In a device of the class described, the combination with a distributing head for a combustible mixture having a vertical slot from which the flame burns, of means for creating a vertical air curtain on one side of said slot and flame.

45. In a device of the class described, the combination with a burner having an air chamber and a combustible mixture chamber, of a manifold having a mixture chamber and air and gas supply chambers communicating therewith, of a duct extending from said mixture chamber to said combustible mixture chamber of the burner, and means for conveying air from the air supply chamber of the manifold to the air chamber of the burner from a point in advance of the mixture chamber of the manifold.

46. In a device of the class described, the combination with a manifold having a mixing chamber, a gas supply chamber communicating with the mixing chamber, an air supply chamber communicating with the mixing chamber, means for regulating the flow of air and gas into said mixing chamber, a mixture outlet port extending from said mixing chamber, an air outlet port extending from said air supply chamber in advance of the mixing chamber, a burner having a combustible mixture chamber and an air chamber, of means establishing communication between the combustible mixture chamber and the port of the mixture chamber of the manifold, and means establishing communication between the air chamber of the burner and the port of the air chamber.

47. In a device of the class described, the combination with a burner including a combustible mixture chamber and an air chamber, a burner tip on said combustible mixture chamber and means cooperating with the air chamber for creating an air curtain on one side of said burner tip, of a manifold having a mixture chamber therein communicating with the combustible mixture chamber of the burner, means for supplying the mixture chamber with gas, and common means for supplying the mixture chamber of the manifold and the air chamber of the burner with air.

48. In a device of the class described, the combination with a burner including a combustible mixture chamber and an air chamber, a burner tip on said combustible mixture chamber and means cooperating with the air chamber for creating an air curtain on one side of said burner tip, of a manifold having a mixture chamber therein communicating with the combustible mixture chamber of the burner, means for supplying the mixture chamber with gas, and common means for supplying the mixture chamber of the manifold and the air chamber of the burner with air, the supply of air to each being independent of the supply of the air to the other.

49. In a device of the class described, the combination with a burner including a combustible mixture chamber and an air chamber, a burner tip on said combustible mixture chamber and means cooperating with the air chamber for creating an air curtain on one side of said burner tip, of a manifold having a mixture chamber therein communicating with the combustible mixture chamber of the burner, means for supplying the mixture chamber with gas, common means for supplying the mixture chamber of the manifold and the air chamber of the burner with air, the supply of air to each being independent of the supply of the air to the other, and means for controlling the flow of air to the mixture chamber of the manifold and the air chamber of the burner.

50. In a device of the class described, the combination with a burner including a combustible mixture chamber and an air chamber, a burner tip on said combustible mixture chamber and means cooperating with the air chamber for creating an air curtain on one side of said burner tip, of a manifold having a mixture chamber therein communicating with the combustible mixture chamber of the burner, means for supplying the mixture chamber with gas, common means for supplying the mixture chamber of the manifold and the air chamber of the burner with air, and means for supplying air under pressure to the air supplying means of the manifold.

51. In a device of the class described, the combination with a burner including a combustible mixture chamber and an air chamber, a burner tip on said combustible mixture chamber and means cooperating with the air chamber for creating an air curtain on one side of said burner tip, of a manifold having a mixture chamber therein communicating with the combustible mixture chamber of the burner, means for supplying the mixture chamber with gas, common means for supplying the mixture chamber of the manifold and the air chamber of the burner with air, the supply of air to each being independent of the supply of the air to the other, and means for supplying air under pressure to the air supplying means of the manifold.

52. In a device of the class described, the combination with a burner including a combustible mixture chamber and an air chamber, a burner tip on said combustible mixture chamber and means cooperating with the air chamber for creating an air curtain on one side of said burner tip, of a manifold having a mixture chamber therein communicating with the combustible mixture chamber of the burner, means for supplying the mixture chamber with gas, common means for supplying the mixture chamber of the manifold and the air chamber of the burner with air, the supply of air to each being independent of the supply of the air to the other, means for controlling the flow of air to the mixture chamber of the manifold and the air chamber of the burner, and means for supplying air under pressure to the air supplying means of the manifold.

In testimony whereof I have hereunto set my hand.

ROY S. LATIMER.